March 10, 1964 E. M. ROSS 3,123,949
CUTTER GUIDE FINGER
Filed June 22, 1962
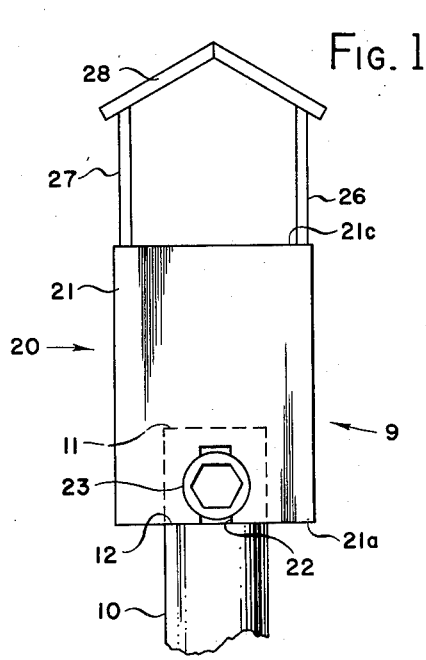
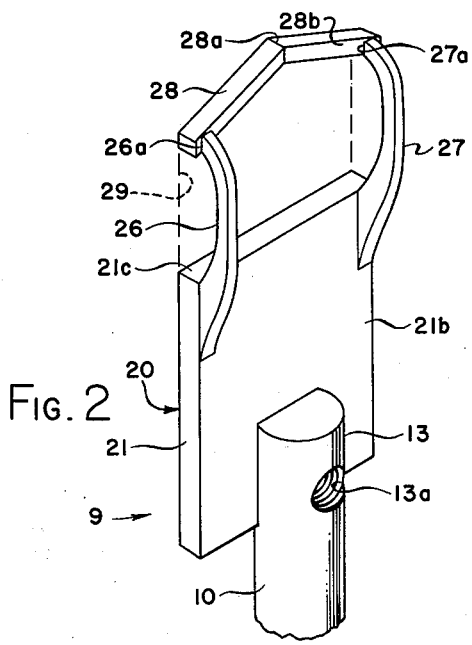
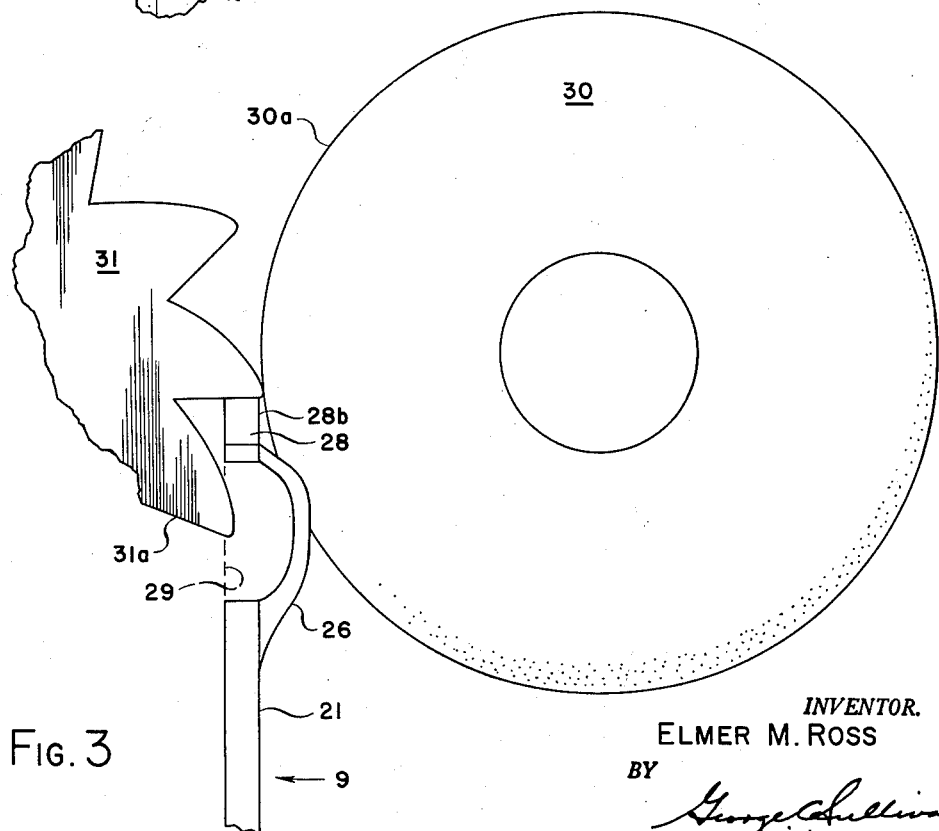
INVENTOR.
ELMER M. ROSS
BY
Agent

United States Patent Office 3,123,949
Patented Mar. 10, 1964

3,123,949
CUTTER GUIDE FINGER
Elmer M. Ross, Rome, Ga., assignor to Lockheed Aircraft Corporation, Burbank, Calif.
Filed June 22, 1962, Ser. No. 204,381
1 Claim. (Cl. 51—238)

This invention relates to a cutter guide finger, and more particularly to a cutter guide finger for guiding the grinding of the outside diameter of mill type cutters.

The guide finger of this invention is particularly adapted for use in the grinding of cutters having closely spaced teeth such as slitting saws, sidemill cutters, and various other cutters such as straight or spiral fluted milling heads wherein the cutter is sharpened by operating a grinding wheel along the sloping back of each tooth thereof. It is conventional practice in the grinding of the sloping backs of the teeth of such cutters to mount the cutter on a bed for transverse motion relative to the front grinding face of a rotating grinding wheel. In the grinding operation, a workman turns the cutter by hand and moves the cutter across the top guiding surface of a guide finger into engagement with the grinding wheel such that the grinding wheel operates on the back of the tooth in a manner more particularly disclosed in the United States Letters Patent 2,291,196 to Stone entitled "Cutter-Guiding Finger for Grinders" patented July 28, 1942. In the grinding of the backs of such cutter teeth, the cutter guide must be positioned closely adjacent the face of the grinding wheel, the guide should form a stable platform relative to which the cutter may be moved, and the guide must be designed so as not to interfere with the cutting operation by abutment with the cutter blade immediately beneath the cutter blade being ground. Prior art cutter guide fingers meet at least some of the three above-listed requirements; however, prior art guide fingers, of which applicant is aware, sacrifice at least one of the above critical requirements to achieve the other two, or achieve the above-listed three requirements by a delicate and time-consuming adjustment of the guide surface of a guide finger relative to the grinding surface of a grinder. The disadvantages and limitations of such prior art cutter guide fingers are eliminated in accordance with this invention.

Accordingly, it is an object of this invention to provide a structurally rigid cutter guide finger for guiding the grinding of the teeth of cutter wheels.

It is another object of this invention to provide a cutter guide finger having spaced-apart posts rigidly supporting a cutter guide member therebetween.

Another object of this invention is to provide a cutter guide finger having a body and structurally rigid spaced-apart posts extending from the body and supporting a cutter guide member therebetween.

A further object of this invention is to provide a cutter guide finger comprising a support post, a cutter guide element removably secured thereto having spaced-apart posts extending cantilever therefrom which are adapted to be disposed on each side of a grinding wheel grinding surface, and a V-shaped cutter guide member supported between the posts.

A still further object of this invention is to provide a cutter guide finger for guiding the teeth of a cutter wheel relative to a rotating grinding wheel, the guide finger having spaced-apart cantilever support posts, and a V-shaped cutter guide member supported between the posts with the apex of the V disposed upwardly with respect to the guide finger proper.

Other objects and advantages will become apparent from the following description taken in connection with the accompanying drawings in which:

FIGURE 1 is a front elevational view of the cutter guide finger of this invention;
FIGURE 2 is a pictorial view showing the back of the cutter guide finger of FIGURE 1; and
FIGURE 3 is a side elevation of the cutter guide finger of FIGURE 1 in operative position.

Generally stated, the cutter guide finger of this invention has spaced-apart rigid cantilever posts rigidly supporting a V-shaped cutter guide member, which provide an inflexible support for the guide member. Being spaced apart, the cantilever posts are adapted to be disposed on each side of a grinding wheel grinding surface such that the guide member supported thereby may be positioned immediately adjacent the grinding surface of the grinding wheel. Additionally, the cantilever support posts are U-shaped or concave in the direction of the cutter wheel being ground to permit use of the guide finger with cup-shaped grinding wheels as well as thin disc-type grinding wheels and to provide a space between the guide member and the body of the finger through which the cutter tooth immediately beneath the cutter tooth being ground can progress without interfering with the grinding operation.

More specifically, there is shown in FIGURES 1 and 2 a cutter guide finger 9 comprising the support post 10 to which the cutter guide element 20 is removably and adjustably secured. Support post 10 is provided with a cutout at its terminal end 11 to provide a seat 12 and a backing portion 13 having a threaded hole 13a therethrough. Guide element 20 has a platelike rectangular body 21 having an elongate cutout 22 in the bottom portion thereof and is secured to support post 10 by a bolt 23 the shank of which extends through cutout 22 and is threadably engaged with threaded hole 13a in backing portion 13. The bottom surface 21a of the body 21 is normally seated on the support post seat 12; however, the elongate slot 22 permits adjustment of the guide element 20 with respect to the support post 10 if desired. Two thin, structurally rigid U-shaped posts 26 and 27 which may be made of tempered steel, for example, are secured to the side 21b of the body 21 in spaced-apart relation so as to extend cantilever from the top surface 21c of body 21. A V-shaped cutter guide member or guide bar 28 is secured at its opposite ends to the front terminal ends 26a and 27a of the support posts 26 and 27, respectively, such that the apex of the V 28a faces away from the body 21. To give the guide member 28 long life and to prevent it from being nicked and scarred by inadvertent contact with a grinding wheel, as when the cutter guide finger is being set up for operation, the cutter guide member 28 should be made of an extremely hard substance, preferably carbide. Cutter guide member 28 is disposed relative to body 21 by U-shaped support posts 26 and 27 to form the opening 29, the unbounded side of which is designated in dotted line.

For the guide finger 9 to operate most effectively, the cutter guide member 28 should be rigidly supported, the front face 28b thereof having the preferable capability of being disposed immediately adjacent the grinding surface of a grinding wheel, with the space 29 permitting the passage of the cutter tooth next beneath the cutter tooth being ground. To this end, as shown in FIGURE 3, the cutter guide finger 9 is constructed and arranged, in accordance with this invention, to be mounted with the support posts 26 and 27 straddling the grinding wheel 30 with the side 28b of cutter guide surface member 28 disposed immediately adjacent the grinding face 30a of the grinding wheel 30 and with the space 29 permitting free passage of the tooth 31a of cutter wheel 31 between guide member 28 and body 21.

While a particular embodiment of the invention has been illustrated and described, it will be obvious to those skilled in the art that various changes and modifications may be made without departing from the invention and it is intended to cover in the appended claim all such modifications and equivalents as fall within the true spirit and scope of this invention.

What is claimed is:

A cutter guide finger comprising:
a support post;
a platelike body removably secured at one end to said support post;
a pair of spaced-apart upstanding U-shaped posts rigidly fixedly secured to the other end of said body and extending cantilever from said body;
and a V-shaped guide bar rigidly fixedly secured between the free terminal ends of said U-shaped posts in spaced-apart relation above said body,
said guide bar being disposed in the plane of said body and oriented such that the apex of the V points in a direction opposite from said body.

References Cited in the file of this patent

UNITED STATES PATENTS

| | | |
|---|---|---|
| 1,398,187 | Guest | Nov. 22, 1921 |
| 1,912,745 | Waltamath | June 6, 1933 |
| 2,156,034 | Thomas | Apr. 25, 1939 |
| 2,368,225 | Lebermann | Jan. 30, 1945 |